(12) United States Patent
Bao

(10) Patent No.: US 6,701,422 B2
(45) Date of Patent: Mar. 2, 2004

(54) MEMORY CONTROL SYSTEM WITH INCREMENTER FOR GENERATING SPECULATIVE ADDRESSES

(75) Inventor: Liewei Bao, Nashua, NH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 11 days.

(21) Appl. No.: 09/823,160

(22) Filed: Mar. 29, 2001

(65) Prior Publication Data

US 2002/0144075 A1 Oct. 3, 2002

(51) Int. Cl.[7] .............................................. G06F 12/06
(52) U.S. Cl. ........................ 711/201; 711/204; 711/209; 711/219
(58) Field of Search ............................... 711/201, 204, 711/209, 213, 219

(56) References Cited

U.S. PATENT DOCUMENTS

| | | | | |
|---|---|---|---|---|
| 4,722,047 A | * | 1/1988 | Chan et al. ................. | 711/202 |
| 5,386,521 A | * | 1/1995 | Saitoh ......................... | 712/207 |
| 5,918,252 A | * | 6/1999 | Chen et al. .................. | 711/217 |
| 6,216,208 B1 | * | 4/2001 | Greiner et al. .............. | 711/137 |

FOREIGN PATENT DOCUMENTS

| EP | 0 501 621 A | 9/1992 |
|---|---|---|
| EP | 0 811 921 A | 12/1997 |

* cited by examiner

*Primary Examiner*—Gary Portka
(74) *Attorney, Agent, or Firm*—Peter Zawilski

(57) ABSTRACT

A memory controller includes an incrementer for predicting a next address to be asserted by a processor. The incrementer, structurally a counter, is configurable to wrap at a wrap boundary and to indicate when a predicted address crosses a page boundary if the memory is in page mode. This incrementer provides accurate predictions even where successor addresses are on different pages or, in the case of address loops, even in some cases in which the successor address is not consecutive. Thus, the number of accurate address predictions is increased, enhancing overall performance. The invention has particular applicability to signal processing applications with instructions loops that cross one or more page boundaries.

10 Claims, 4 Drawing Sheets

MEMORY CONTROL SYSTEM WITH INCREMENTER FOR GENERATING SPECULATIVE ADDRESSES

BACKGROUND OF THE INVENTION

The present invention relates to computers and, more particularly, to memory controllers for computers. A major objective of the invention is to provide for more effective speculative addressing by a memory controller.

Much of modern progress is associated with the increasing prevalence of computers. A typical computer has memory for storing data and instructions and one or more processors (e.g., a "central processing unit" or "CPU") for executing the instructions and manipulating data accordingly. The instructions executed by computers are relatively simple; complex tasks can be accomplished by executing programs with large numbers of instructions. The prowess of computers is largely due to the speed with which the instructions can be executed.

Advances in computer technology have provided dramatic increases in computer performance. As dramatic as the advances have been, there is an insatiable demand for more computing power. One speed bottleneck is the time it takes for data and instructions to be transferred between processor and memory. While, in principle, processor would communicate directly with memory, the rapid design cycles for both processor and memory make it difficult for the processors and memories to interface optimally upon introduction to the market.

For example, some memories provide for a paged mode in which it can be assumed that only low-order address bits need to be examined to determine a next address. Since fewer address lines need to be examined, the memory can respond to addresses more rapidly. When a page change is required, a page-boundary detection signal is to be sent to the memory, in which case the memory responds by looking at all the address bits. In general, processors are not "aware" of memory specifics, such as the presence of a page mode, so there is a problem of optimally interfacing processors and memory.

Memory controllers can be designed in a relatively short time to interface between a processor and a memory type so that the optimal memory-operating mode could be used. The presence of the memory controller adds a potential latency to memory accesses, since instead of being transmitted directly to the memory, an address asserted by a processor must be forwarded to or translated and then forwarded to the memory. On the other hand, a memory controller can speed up accesses by accessing memory in anticipation of predicted next addresses. Typically, memory addresses are accessed sequentially, so the prediction can simply involve selecting the next address in a series. Some processors indicate whether the next address is sequential or not, so the validity of the prediction is known even before the next address is received.

The predictive approach improves performance to the extent the predictions are accurate. Typically, the predictions are accurate when the addresses are sequential and do not cross page boundaries. An objective of the present invention is to provide for further performance improvements by enlarging the class of accurate predictions.

SUMMARY OF THE INVENTION

The present invention addresses two important cases of address prediction: wrapping of an address in case of crossing wrap boundaries in a burst transfer at the processor side, and crossing page boundaries at the memory side. The present invention provides a memory controller that provides predictive addresses that wrap at a programmable wrap boundary and/or provides predictive page-boundary detection signals. In one aspect the invention is a memory controller with a incrementer in the form of a programmable counter, while in another the invention is a computer system with such a memory controller. The inventive method can involve the predictive wraps, predictive page boundary detections or both.

In the case of a wrap boundary of a burst transfer, the invention provides for wrapping without interrupting the performance enhancement achieved by accurate address predictions. Where predictive page boundaries are used, a series of accurate predictions can proceed with little or no interruption across page boundaries. The predictive wraps and page boundary detections can be used together in the case of a loop that extends across page boundaries. These and other features and advantages of the invention are apparent from the description below with reference to the following drawings.

DESCRIPTION OF THE PREFERRED EMBODIMENTS

Figure 1:
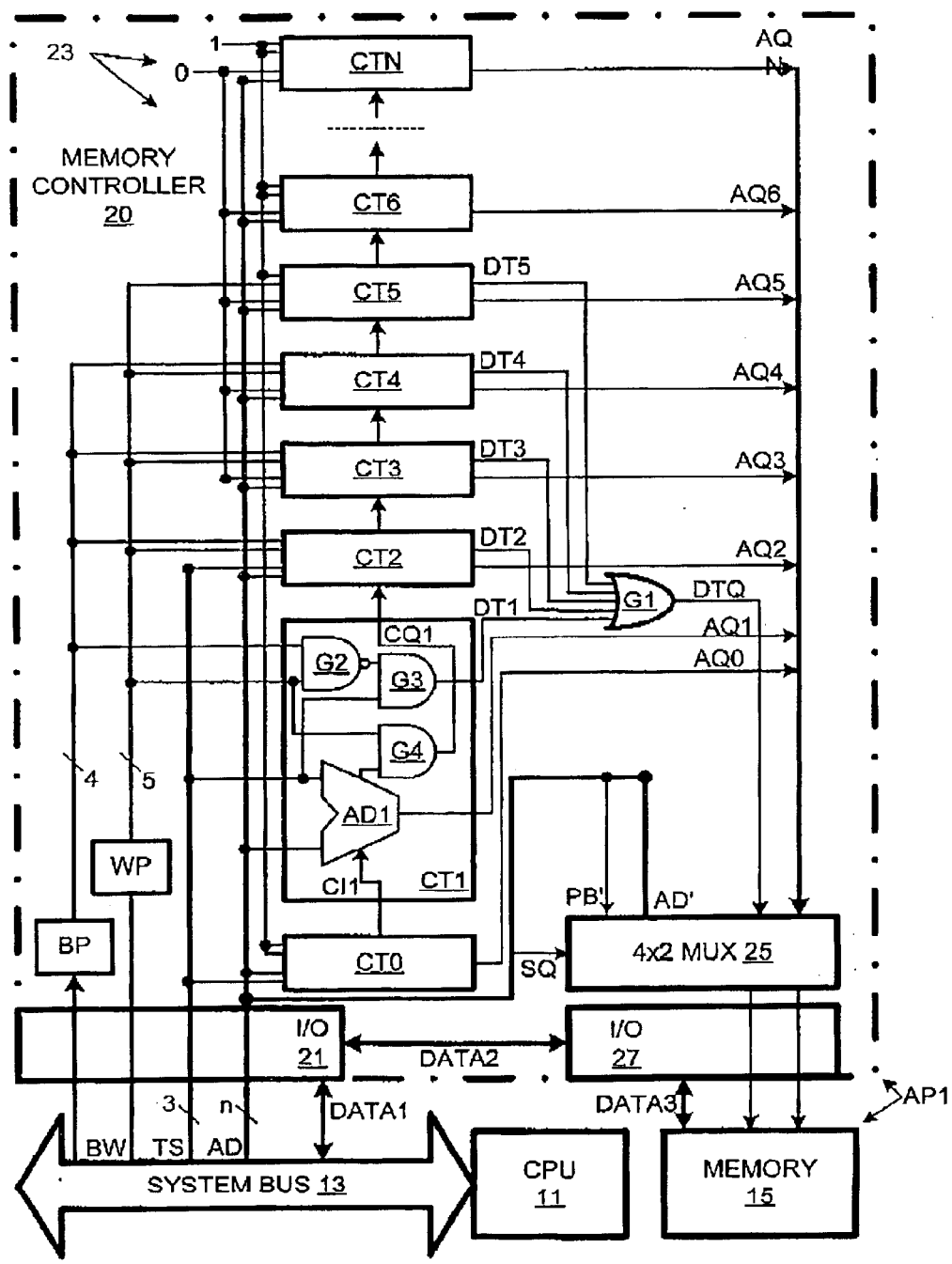
FIG. 1 is a schematic logic diagram of a computer system with memory controller in accordance with the present invention.

In accordance with the present invention, a computer system AP1 comprises a processor (CPU) 11, a system bus 13, memory 15 and a memory controller 20, as shown in FIG. 1. Memory controller 20 has a system-bus interface 21, a page-value register BP, an incrementer 23, a multiplexer 25, and a memory interface 27. Interfaces 21 and 27 are functional elements rather discrete structural elements as they are co-located with processor 11 and bus 13 on a single integrated circuit. Structurally, incrementer 23 is a programmable counter with N bit-counter elements CT0–CTN and an OR-gate G1.

Processor 11 transmits via system bus 13 to memory controller 20 the following signals: data DATA1, addresses AD, a transfer-size indication TS, and a wrap-boundary value BW. In FIG. 1, TS=001 if the transfer size is byte; TS=010 if the transfer size is two-bytes (half word in a 32-bit system or a word in a 16-bit system); TS=100 if the transfer size is four-bytes (word in a 32-bit system or double word in a 16-bit system). In supervisor mode, processor 11 can provide a page boundary value to register BP.

The data can include data to be stored in register BP, which is located within the address space of processor 11. Associated with addresses AD are indications of whether an operation is a read or a write, and whether an address is sequential or not. In the event of a read operation, data is transferred from memory 15, through memory controller 20, via system bus 13, and to processor 11.

As shown in detail in FIG. 1, bit-counter element CT1 includes a one-bit adder AD1, a NAND gate G2, and two AND gates G3 and G4. Element CT1 accepts the lowest order bits from each of the page and wrap registers BP and WP, the second least-significant bit of transfer-size signal TS and the second least-significant bit of an address signal AD. The address signal AD and the transfer-size signal TS are provided to respective addend inputs of adder AD1. A carry-in is also provided from bit-counter element CT0. In effect, the output AQ1 of adder AD1 is the second-least significant bit of the successor address for the given word width. The remaining bit-counter elements CT0 and CT2–CTN provide the remaining bits of the successor address. Thus the function of incrementer 23 is to provide the successor address to the address presently asserted by processor 11.

Figure 2:
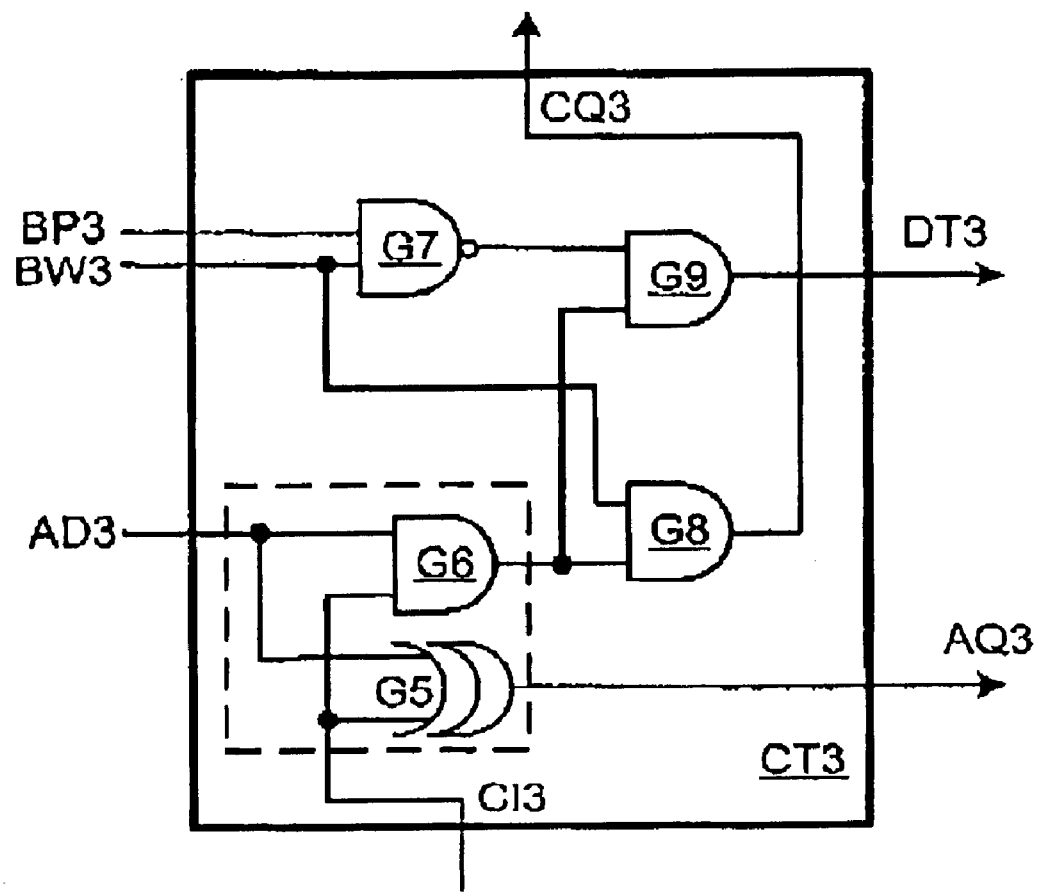
FIG. 2 is a schematic logic diagram of a one-bit-counter element of the memory controller of FIG. 1.

Except for obvious simplifications, bit-counter elements CT0–CTN are similar. For example, bit-counter element CT3 is shown in FIG. 2. Instead of a 1-bit adder, it has a 1-bit incrementer including an XOR gate G5 and an AND gate G6. The remaining logic gates, NAND gate G7, and AND gates G8 and G9 correspond with counterparts in bit-counter element CT1. XOR gate G5 has address bit AD3 and carry-in C13 as its inputs to generate predictive address bit AQ3; AND gate G6 has the same inputs to generate in conjunction with gates G7, G8, and G9, page boundary detection bit DT3 and carry out CQ3.

Bit-counter element CT4 is essentially similar to bit-counter element CT3. Bit-counter elements CT5–CTN also employ 1-bit incrementers, but the ancillary logic is reducible due to the one or more constant inputs. The page boundary inputs to bit-counter elements CT5–CTN are held high because memory control 20 does not provide for page sizes greater than 32 bytes. The word-boundary input to bit-counter element CT5 is controlled by word-boundary signal BW while the corresponding inputs to bit-counter elements are held high to accommodate a maximum 64-byte wrapping burst transfer. Bit-counter element CT0 can be a one-bit adder with no carry-in signal.

Figure 3:
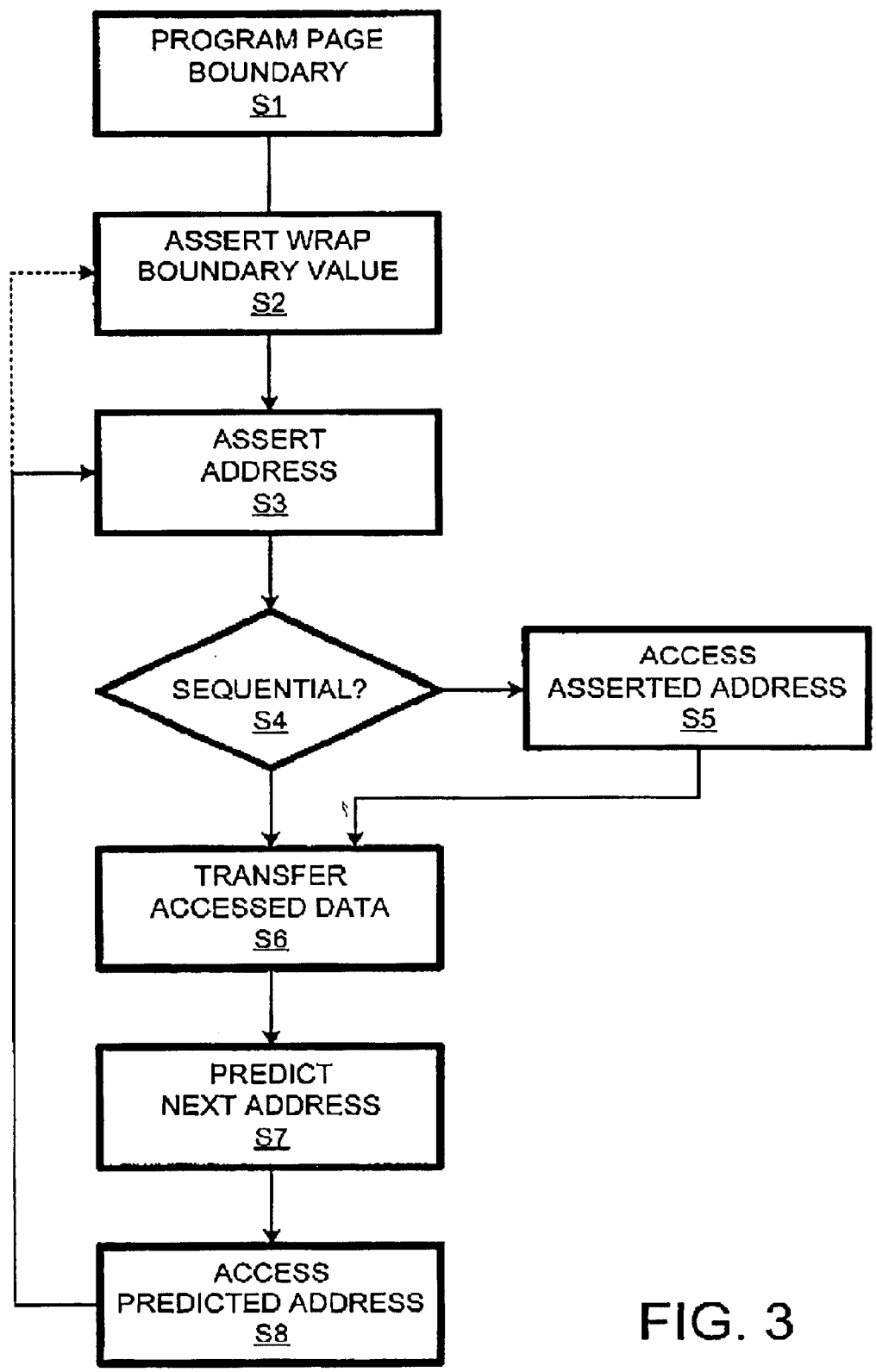
FIG. 3 is a schematic diagram of a portion of an alternative memory controller incorporating a carry-select technique for enhanced performance.

A method M1 of the invention practiced in the context of system AP1 is flow-charted in FIG. 3. At step S1, the page boundary value is entered into register BP. Typically, this occurs in supervisor mode and the page-boundary value is not changed during user program execution. In system AP1, register BP is a conventional writable register. However, in applications where there is no need to change the page boundary value, it can be hard-wired or encoded in read-only memory.

At step S2, a wrap-boundary is asserted during user program execution. The wrap boundary is a value at which incrementer 23 resets to zero, and thus serves as the count modulo. This count modulo can be changed during program execution so that loops of different sizes can be managed optimally.

At step S3, processor 11 initiates a read or write operation by asserting an address, along with an address-width value, and a sequential/nonsequential indication SQ. Memory controller 20 uses the sequential/nonsequential indication to determine, at step S4, whether the operation is sequential or not. When a sequential address is indicated, multiplexer 25 selects AQ; when a non-sequential transfer is indicated, multiplexer 25 selects address AD'. In an alternative embodiment, a memory controller selects the counter output except when a comparator indicates it is not equal to the address asserted by the processor.

If the address is not sequential, method M1 proceeds to step S5. The data stored at the location indicated by the asserted address is selected for data transfer. If a read operation is requested, the data is transferred at step S5 from memory 15 via bus DATA3 to memory interface 27, via data bus DATA2 to system-bus interface 21, to system bus 13, to processor 11. If a write operation is requested, the data is transferred from processor 11, via system bus 13, to system-bus interface 21, via bus DATA2, through memory interface 27 to memory 15. If at step S4, the address is determined to be sequential, the data transferred at step S6 is the data already accessed from memory 15 from address location AQ.

After either step S5 or S6, incrementer 23 generates a predictive address at step S7. This is achieved by adding the address width indicated by transfer-size signal TS to the currently or most recently asserted address AD'. The addition is modulo BW so the address wraps at the programmed wrap boundary. Also, if a page boundary is met, a detection indication is generated along line DTQ. At step S8 the data at the predicted address in memory 15 is accessed and buffered at memory interface 27. This data is transferred if the prediction is confirmed and overwritten if it is disconfirmed at the next iteration of step S3.

The method iterates generally by returning to step S3, in which the processor asserts the next "asserted" address. However, as indicated by a dashed line in FIG. 3, a next iteration can involve setting a new wrap boundary at step S2. In general, page boundaries are less likely to be changed during execution of a program.

The speed with which predictive addresses can be generated in system AP1 is limited by the carry-propagation design of incrementer 23. Bit-counter element CT1 cannot determine its carry and address outputs until bit-counter element CT0 determines its carry output. Likewise, bit-counter elements CT2–CTN require carries from lower-order bit-counter elements to determine their results. Thus, a carry must propagate through N stages for a predictive address to be generated.

Figure 4:
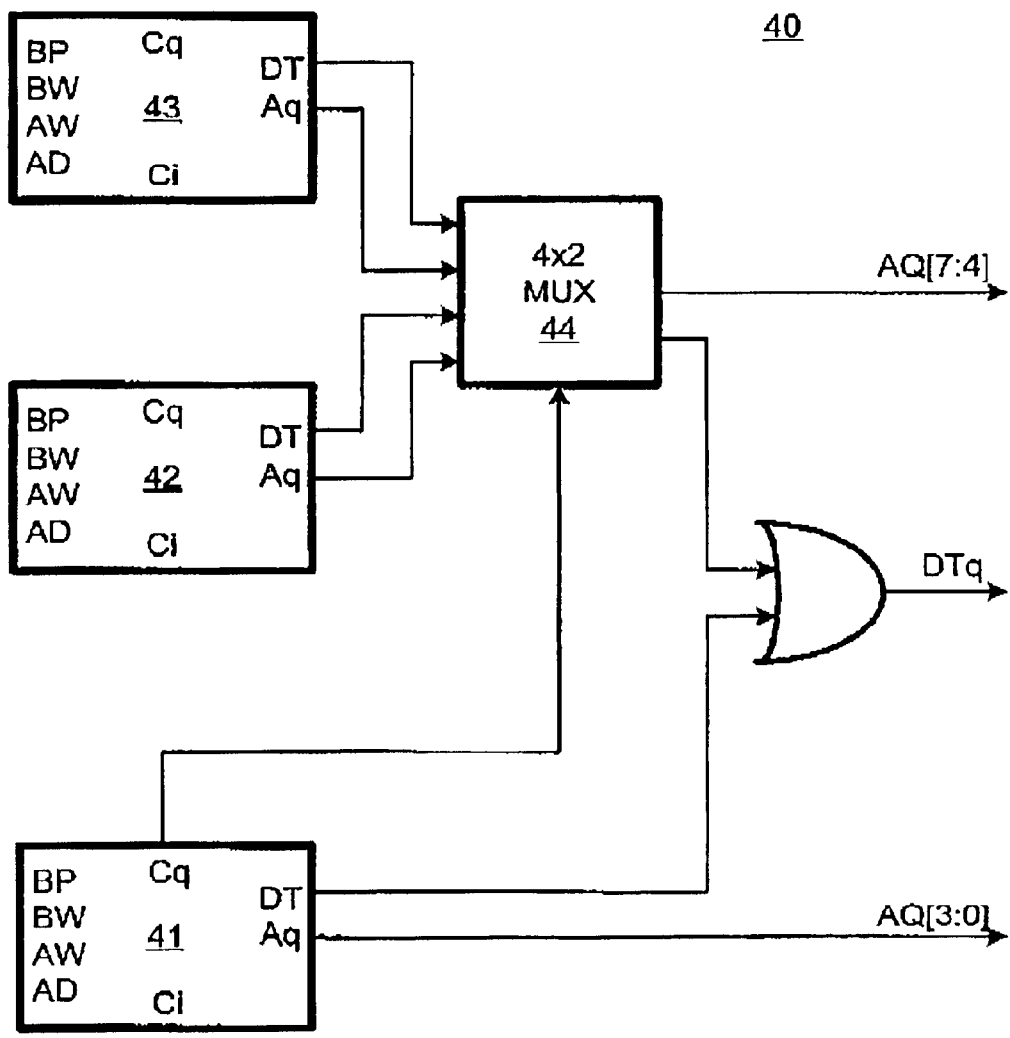
FIG. 4 is a flow chart of a method of the invention utilized in the computer system of FIG. 1.

To reduce the latency due to carry propagation, a carry-select counter 40, shown in FIG. 4, can be used instead of incrementer 23. Conceptually, counter 40 divides its positions, 0–7, into low and high-order groups. Four least-significant bit counter elements constitute the low order bit-counter group 41, which thus provides a 4-bit output AQ[3:0]. There are two high-order groups 42 and 43, each of which includes bit-counter elements for the four most-significant bit positions (4–7). Groups 42 and 43 differ only in that bit-counter group 42 has its carry-in hard wired to 0, while group 43 has its carry-in hard-wired to 1.

In effect, groups 42 and 43 pre-calculate the high-order results for the two possible results for the carry-out Cq of low-order group 41. When the low-order carry-out is determined, it is used to select one of the two high order results. If CQ3 is 0, then a multiplexer 44 selects the results of high-order group 42; if CQ3 is 1, then multiplexer 44 select the results of high-order group 43. The selected detection signals DT[4–7] are ORed with the detection signals DT[0–3] from low order group 41 to determine the overall page-boundary detection signal DT[0–8]. In this case, the latency required for generating the predictive address is reduced almost by half relative to incrementer 23, but at the expense of additional integrated-circuit area due to the extra high-order bit-counter elements and multiplexer 44.

The present invention has applicability to computers and integrated circuits generally, and especially to signal processing applications. The invention applies using different host systems, different memory controller designs and different counter designs. These and other variations upon and modifications to the described embodiments are provided for by the present invention, the scope of which is defined by the following claims.

What is claimed is:

1. A system comprising:

an incrementer for generating speculative addresses as a wrap-boundary function of a wrap-boundary value and respective asserted addresses, said incrementer implementing an increment function with a modulo number that is a modulo-number function of said wrap-boundary value, said incrementer being coupled to a bus interface for receiving said wrap-boundary value and said asserted addresses from a processor, said incrementer being coupled to a memory interface for providing said speculative addresses thereto.

2. A memory controller as recited in claim 1 wherein said incrementer generates page-boundary detection signals for plural but not all of said speculative addresses.

3. A memory controller as recited in claim 2 wherein the speculative addresses for which said incrementer generates page-boundary boundary detection signals are determined as a function of a page-boundary value received from said processor via said system bus.

4. A memory controller as recited in claim 3 wherein said page-boundary value corresponds to a page size of a memory, said incrementer providing said speculative addresses and said page-boundary detection signals to said memory.

5. A computer system comprising:

an incrementer as recited in claim 1;

said processor;

said system bus; and said memory.

6. A method of operating a memory controller, said method comprising the steps of:

receiving a wrap-boundary value from a processor;

receiving an asserted address from said processor;

generating a speculative address by incrementing said asserted address according to a modulo number that is, at least in part, a function of said wrap-boundary; and transmitting said speculative address to a memory.

7. A method as recited in claim 6 comprising generating a page-boundary indicator for plural but not all of said speculative addresses.

8. A method as recited in claim 7 further comprising receiving a page-boundary value from said processor, said page-boundary indicator being generated for speculative addresses determined as a function of said page-boundary indicator.

9. A method as recited in claim 8 wherein said page-boundary value corresponds to a page size of said memory.

10. A method of operating a memory controller, said method comprising the steps of:

receiving a page-boundary value from a processor;

receiving an asserted address from said processor;

generating a speculative addresses by incrementing said asserted address; and transmitting a page-boundary detection signal whenever a speculative address is generated that corresponds to a page boundary as indicated by said page boundary value.

\* \* \* \* \*